(12) United States Patent
Tada et al.

(10) Patent No.: US 10,022,831 B2
(45) Date of Patent: Jul. 17, 2018

(54) INDUSTRIAL MACHINE PROVIDED WITH FOREIGN MATTER EXPULSION MECHANISM

(71) Applicant: Toshiba Kikai Kabushiki Kaisha, Chiyoda-ku, Tokyo (JP)

(72) Inventors: Atsushi Tada, Numazu (JP); Minoru Kuroiwa, Gotemba (JP)

(73) Assignee: Toshiba Kikai Kabushiki Kaisha, Chiyoda-ku, Tokyo (JP)

( * ) Notice: Subject to any disclaimer, the term of this patent is extended or adjusted under 35 U.S.C. 154(b) by 81 days.

(21) Appl. No.: 15/024,538

(22) PCT Filed: Jun. 16, 2015

(86) PCT No.: PCT/JP2015/067228
§ 371 (c)(1),
(2) Date: Mar. 24, 2016

(87) PCT Pub. No.: WO2016/006394
PCT Pub. Date: Jan. 14, 2016

(65) Prior Publication Data
US 2016/0229018 A1    Aug. 11, 2016

(30) Foreign Application Priority Data

Jul. 11, 2014 (JP) ................................. 2014-143431

(51) Int. Cl.
*B23Q 11/12* (2006.01)
*B23Q 1/26* (2006.01)
(Continued)

(52) U.S. Cl.
CPC .............. *B23Q 11/124* (2013.01); *B23Q 1/26* (2013.01); *B23Q 1/42* (2013.01); *B23Q 11/0042* (2013.01);
(Continued)

(58) Field of Classification Search
CPC .............. B23Q 11/124; B23Q 11/0042; B23Q 11/0875; B23Q 1/26; B23Q 1/42
See application file for complete search history.

(56) References Cited

U.S. PATENT DOCUMENTS 2,425,526 A * 8/1947 Friedman ........... B23Q 11/0875
15/236.08
2,539,769 A * 1/1951 Berthiez ............ B23Q 11/0875
384/15
(Continued)

FOREIGN PATENT DOCUMENTS

CN 102472319 5/2012
CN 102472320 5/2012
(Continued)

OTHER PUBLICATIONS

English Language Translation of International Search Report for PCT/JP2015/067228 dated Sep. 1, 2015.
(Continued)

*Primary Examiner* — Michael A Riegelman
(74) *Attorney, Agent, or Firm* — DLA Piper LLP US (57) ABSTRACT

A foreign-substance discharge mechanism includes: a lubricating-liquid groove provided on a sliding surface of a wedge member and configured to receive a lubricating liquid; and a foreign-substance collector provided to the lubricating-liquid groove and configured to collect foreign substances existing in the lubricating-liquid groove. A first end and a second end of the lubricating-liquid groove are spaced apart from each other in a relative movement direction of the wedge member and the table bed. Disadvantages caused by the presence of the foreign substances between the sliding surfaces can be easily avoided by reliably collecting the foreign substances existing between the sliding surfaces using the lubricating-liquid groove and the foreign-substance collector.

8 Claims, 9 Drawing Sheets

(51) Int. Cl.
    *B23Q 11/00* (2006.01)
    *B23Q 1/42* (2006.01)
    *B23Q 11/08* (2006.01)

(52) U.S. Cl.
    CPC . *B23Q 11/0875* (2013.01); *Y10T 409/303976* (2015.01); *Y10T 409/304088* (2015.01)

(56) References Cited

U.S. PATENT DOCUMENTS

| | | | | |
|---|---|---|---|---|
| 3,754,799 | A * | 8/1973 | Hedberg | F16C 29/025 384/114 |
| 3,903,993 | A * | 9/1975 | Vorrhees | B30B 15/041 184/100 |
| 5,399,023 | A * | 3/1995 | Winkelmann | B23Q 11/0875 384/13 |
| 5,570,958 | A * | 11/1996 | Tsukada | F16C 29/0611 384/13 |
| 5,694,811 | A * | 12/1997 | Tsukada | F16C 29/0642 384/13 |
| 6,250,805 | B1 * | 6/2001 | Kuwahara | F16C 29/064 384/15 |
| 6,749,378 | B2 * | 6/2004 | Saito | B23Q 1/017 409/135 |
| 7,140,775 | B2 * | 11/2006 | Saito | F16C 17/102 384/12 |
| 7,465,091 | B2 * | 12/2008 | Hsu | F16C 29/0664 384/13 |
| 2006/0023978 | A1 * | 2/2006 | Haub | F16C 29/0609 384/13 |
| 2007/0201775 | A1 | 8/2007 | Saito | |
| 2013/0136384 | A1 | 5/2013 | Tsai | |
| 2015/0040697 | A1 | 2/2015 | Yamane et al. | |
| 2016/0115993 | A1 * | 4/2016 | Tada | F16C 29/025 384/12 |
| 2016/0115994 | A1 * | 4/2016 | Tada | F16C 29/025 384/12 |

FOREIGN PATENT DOCUMENTS

| | | |
|---|---|---|
| CN | 102597553 | 7/2012 |
| CN | 203239758 | 10/2013 |
| CN | 203297348 | 11/2013 |
| JP | 48-44083 U1 | 6/1973 |
| JP | 62-141998 U | 9/1987 |
| JP | H05-202936 | 8/1993 |
| JP | 06-246584 | 9/1994 |
| JP | H07-41491 | 5/1995 |
| JP | 07-040049 U | 7/1995 |
| JP | 08-057739 | 3/1996 |
| JP | 10-015778 | 1/1998 |
| JP | H11-280995 | 10/1999 |
| JP | 2002-061635 | 2/2002 |
| JP | 3576751 B | 7/2004 |
| JP | 2005-313272 | 11/2005 |
| JP | 2008-297108 | 12/2008 |
| JP | 2011-140969 | 7/2011 |
| JP | 5306437 | 7/2013 |
| JP | 2013-148187 | 8/2013 |

OTHER PUBLICATIONS

English Language Abstract JP H08-057739 published on Mar. 5, 1996.
English Language Machine Translation of JP 07-040049 published on Jul. 18, 1995.
English Language Abstract and Machine Translation of JP 2008-297108 published on Dec. 11, 2008.
English Language Abstract of JP 06-246584 published on Sep. 6, 1994.
English Language Abstract and Machine Translation of JP 2011-140969 published on Jul. 21, 2011.
English Language Abstract and Machine Translation of JP 2013-148187 published on Aug. 1, 2013.
English Language Abstract of JP 2002-061635 published on Feb. 28, 2002.
English Language Abstract and Machine Translation of JP 10-015778 published on Jan. 10, 1998.
English Language Abstract and Machine Translation of JP 2005-313272 published on Nov. 10, 2005.
English Language Abstract and Machine Translation of JP 10-337634 (which corresponds to JP 3576751B) published on Jul. 16, 2004.
Chinese Office Action (with English Language Translation) issued in CN 201580001796.5 dated Nov. 9, 2016.
English Language Abstract and Machine Translation of CN 102472319 published on May 23, 2012.
English Language Abstract and Machine Translation of CN 102472320 published on May 23, 2012.
English Language Abstract and Machine Translation of CN 102597553 published on Jul. 18, 2012.
English Language Abstract and Machine Translation of CN 203239758 published on Oct. 16, 2013.
English Language Abstract and Machine Translation of CN 203297348 published on Nov. 20, 2013.
Korean Office Action (with English Translation) issued in KR 10-2016-7008580 dated Jun. 20, 2017.
English Language Abstract of JP H05-202936 published on Aug. 10, 1993.
English Language Abstract of JP H11-280995 published on Oct. 15, 1999.
International Preliminary Report on Patentability (with Written Opinion) issued in PCT/JP2015/067228 dated Jan. 17, 2017.
English Language Translation of the Written Opinion issued in PCT/JP2015/067228 dated Nov. 30, 2016
Korean Notice of Allowance issued in KR 10-2016-70085580 dated Nov. 21, 2017.

* cited by examiner

INDUSTRIAL MACHINE PROVIDED WITH FOREIGN MATTER EXPULSION MECHANISM

CROSS REFERENCE TO RELATED APPLICATIONS

This application is a U.S. National Stage Application of International Application No. PCT/JP2015/067228 filed Jun. 16, 2015, which claims priority from Japanese Patent Application No. 2014-143431 filed Jul. 11, 2014. The entirety of all the above-listed applications are incorporated herein by reference.

TECHNICAL FIELD

The present invention relates to an industrial machine including a foreign-substance discharge mechanism.

BACKGROUND ART

An industrial machine in a form of a machine tool configured to machine (e.g., cut) a workpiece set on a table with a tool by moving the table and the tool in a plurality of axial directions has been known.

When the workpiece is machined with the tool, cut powders are generated. When the cut powders enter between sliding surfaces of relatively movable members of the machine tool, various disadvantages are caused.

The table on which the workpiece is set includes a table base. The table base is movable relative to a table bed extending in a horizontal axis (X axis) while sliding on a reference plane of the table bed. Cut powders generated during machining the workpiece are likely to be accumulated on a top surface (the reference plane) of the table bed. The cut powders fall along a vertical surface (the reference plane) of the table bed by gravity. The fallen cut powders cause a lapping phenomenon between a cast quenching surface of the table bed and a resin sliding material of the table base to influence a large range of the sliding surface.

For this reason, a countermeasure against inhibiting the cut powders from entering between the sliding surfaces of the two relatively movable members is applied to the machine tool.

The countermeasure against the cut powders is exemplified by a cut-powder discharge device including a column fixed to a base frame and a table movable along a Y axis of a bed, in which the cut powders on a table rear surface are transferred to a chip conveyor using the movement of the table along the Y axis and the cut powders are discharged to the outside using the chip conveyor (Patent Literature 1).

In the above typical example of Patent Literature 1, the table is provided to the bed through a saddle. The saddle is movable along the Y axis relative to the bed. A gutter-shaped recess is formed along the Y axis on a top surface of the bed. The saddle includes a wiper shaped in conformity to the recess. By the movement of the table along the Y axis, the wiper discharges the cut powders fallen in the recess of the bed to a U-shaped groove of a screw conveyor. The wiper inhibits the cut powders from entering between sliding surfaces of the saddle and the bed. The column is attached with a spindle head, a tool replacement device and the like.

Another example of the countermeasure against the cut powders is a sliding-surface protection device including: a screen cover that covers a front side and lateral sides of an X-axis sliding surface of a lower saddle; and a cutting-liquid nozzle provided in the screen cover (Patent Literature 2).

In the typical example of Patent Literature 2, when a cutting liquid is supplied to the sliding surface by the cutting-liquid nozzle, fine cut powders on the sliding surface are washed away.

Although not an example of the countermeasure against the cut powders, an elevator including a device configured to discharge abrasion powders and chips generated on the sliding surface to the outside is disclosed (Patent Literature 3).

In the typical example of Patent Literature 3, a groove is provided on a sliding surface of a damper for stopping at emergency and the abrasion powders and the like are discharged from the groove to the outside to prevent abnormal abrasion of components. The groove extends in a direction orthogonal to a longitudinal direction of a guide rail of the damper on a damping surface facing the guide rail. Both ends of the groove are opened.

Further, in machine tools, a lubricating oil is flowed along an oil groove in order to prevent abrasion of the two relatively movable members (Patent Literatures 4 to 6).

A typical example of Patent Literature 4 discloses a device configured to supply the lubricating oil on a sliding surface of a T-slotted rail. In a typical example of Patent Literature 5, a saddle is slidably supported on a guide surface of a slide base and includes an oil groove on a surface facing the slide base. In a typical example of Patent Literature 6, a middle table includes an oil groove, which is configured to supply a lubricating oil, on a sliding surface facing a saddle.

CITATION LIST

Patent Literature(s)

Patent Literature 1: JP-A-8-57739
Patent Literature 2: CD-ROM of JP Utility Model Application No. 5-74031 (JP-UM Publication No. 7-40049)
Patent Literature 3: JP-A-2008-297108
Patent Literature 4: JP Patent No. 3576751
Patent Literature 5: JP-A-6-246584
Patent Literature 6: JP-A-10-15778

SUMMARY OF THE INVENTION

Problem(s) to be Solved by the Invention

In the typical example of Patent Literature 1, since the wiper is used for the countermeasure against the cut powders, when there is a gap between an end of the wiper and the recess of the bed, the cut powders enter between the sliding surfaces through the gap. Particularly, since corners of the sliding surfaces are usually chamfered, a gap is generated at the chamfered corners, through which the cut powders enter between the sliding surfaces through the gap.

In the typical example of Patent Literature 2, since the cutting liquid is sprayed on the sliding surface by the cutting-liquid nozzle, a large device is required. Moreover, the cut powders are not always completely washed away only by spraying the cutting liquid. Particularly, when the cut powders are stuck on the sliding surface, the cut powders are left on the sliding surface even when the cutting liquid is sprayed.

The typical example of Patent Literature 3 is devised for solving the problem specific to the elevator and does not propose a problem relating to the countermeasure against the cut powders of the machine tool. Moreover, although the device is configured to collect the abrasion powders generated during damping of the elevator into the groove of the damper, when the abrasion powders collected in the groove leak from the opening of the both ends of the groove, the abrasion powders may enter between the guide rail and the damper.

The typical examples of Patent Literatures 4 to 6 only disclose the oil groove for flowing the lubricating oil on the sliding surface of the two relatively movable members. When the cut powders enter between the sliding surfaces of the two members, the lapping phenomenon influences a large range of the sliding surfaces through the oil groove.

The problem raised in the above typical examples is also caused by foreign substances (e.g., dust and sand) other than the cut powders, and is not unique to the machine tool but also possible in an industrial machine having the sliding surfaces.

An object of the invention is to provide an industrial machine including a foreign-substance discharge mechanism capable of discharging foreign substances existing between sliding surfaces to an outside with a simple structure.

Means for Solving the Problem(s)

According to an aspect of the invention, an industrial machine including a foreign-substance discharge mechanism includes: a first member and a second member that are movable relative to each other and that have respective sliding surfaces facing each other; a lubricating-liquid groove provided on at least one of the sliding surfaces of the first and second members and configured to receive a lubricating liquid; and a foreign-substance collector provided to the lubricating-liquid groove and configured to collect foreign substances existing in the lubricating-liquid groove, in which a first end and a second end of the lubricating-liquid groove are spaced apart from each other in a relative movement direction of the first member and the second member.

In the above aspect of the invention, the first member and the second member are relatively movable in conjunction with machining of a workpiece. Since the lubricating-liquid groove formed between the sliding surfaces of the first and second members receives the lubricating liquid, the relative movement of the first and second members is smooth.

When foreign substances (e.g., cut powders, dust, sands, pebbles and garbage) generated during the machining of the workpiece enter between the sliding surfaces of the first and second members, the foreign substances proceed into an inside of the lubricating-liquid groove in conjunction with the relative movement of the first and second members. By further relative movement of the first and second members, the foreign substances are moved within the inside of the lubricating-liquid groove and collected by the foreign-substance collector provided to the lubricating-liquid groove. The foreign substances collected by the foreign-substance collector stay in the foreign-substance collector in spite of the relative movement of the first and second members. The foreign substances accumulated in the foreign-substance collector are discharged to the outside as needed.

With the above arrangement, disadvantages caused by the presence of the foreign substances between the sliding surfaces can be easily avoided by reliably collecting the foreign substances existing between the sliding surfaces using the lubricating-liquid groove and the foreign-substance collector instead of blocking the foreign substances generated on the machining from entering between the sliding surfaces of the first and second members.

In the above aspect of the invention, preferably, the relative movement direction of the first member and the second member is in alignment with a horizontal direction, the sliding surfaces each are in a form of a vertical surface, and the foreign-substance collector is provided to a lower portion of the lubricating-liquid groove.

With this arrangement, the foreign substances existing between the sliding surfaces formed on the vertical surfaces of the first and second members tend to fall, but are reliably collected by the foreign-substance collector provided to the lower portion of the lubricating-liquid groove.

Herein, the lower portion of the lubricating-liquid groove having a predetermined shape refers not only to a portion positioned at the lowest end of the lubricating-liquid groove but also to a portion positioned at a projecting end lower than other portions, and further refers to a portion positioned at a position slightly upper than the lowest end and the projecting end (e.g., at a position lower than a half of a vertical length of the lubricating-liquid groove).

In the above aspect of the invention, the industrial machine preferably further includes a lubricating-liquid flow mechanism configured to forcibly flow the lubricating liquid into the lubricating-liquid groove.

With this arrangement, since the lubricating liquid is forcibly flowed into the lubricating-liquid groove by the lubricating-liquid flow mechanism, lubrication between the first and second members can be reliably obtained and further the foreign substances existing in the lubricating-liquid groove can be reliably discharged to the outside.

In the above aspect of the invention, preferably, the lubricating-liquid groove has a first end on a side near an outer circumference of the industrial machine and a second end on a side near a center of the industrial machine, and the foreign-substance collector is disposed on the side of the lubricating-liquid groove near the outer circumference of the industrial machine.

With this arrangement, since the foreign-substance collector is disposed near the outer circumference of the industrial machine, an operation for discharging the foreign substances from the foreign-substance collector is facilitated.

In the above aspect of the invention, preferably, the lubricating-liquid groove includes: a plurality of vertical portions that extend in a vertical direction and are provided side by side in the horizontal direction; and inclined portions that each connect a lower end of a first vertical portion to an upper end of a second vertical portion among adjacent ones of the vertical portions, the first vertical portion being positioned near the center of the industrial machine, the second vertical portion being positioned near the outer circumference of the industrial machine, and the lubricating-liquid groove defines a groove continuous from the first end to the second end.

With this arrangement, the foreign substances existing in the lubricating-liquid groove are moved up along the inclined portion and moved down along the vertical portion in conjunction with the relative movement of the first and second members.

For instance, it is easier for the foreign substances positioned at the lowest end of the vertical portion to be moved obliquely up on the inclined portion than to be moved up along the vertical portion. The foreign substances moved up along the inclined portion to be positioned at the upper end of the vertical portion are moved down along the vertical portion by their own weights.

By repeating this movement of the foreign substances, the foreign substances are zigzag moved in the lubricating-liquid groove and are finally transferred to the foreign-substance collector positioned at the outer circumference of the industrial machine.

Accordingly, with this alternate arrangement of the vertical portion and the inclined portion, the foreign substances can be reliably transferred to the foreign-substance collector.

In the above aspect of the invention, preferably, the inclined portions each connect a lower portion of the first vertical portion to an upper portion of the second vertical portions among the adjacent ones of the vertical portions.

With this arrangement, since the inclined portion is in a straight shape, the structure of the lubricating-liquid groove can be simplified.

In the above aspect of the invention, preferably, the lubricating-liquid groove includes: a plurality of vertical portions that extend in a vertical direction and are provided side by side in the horizontal direction; an upper horizontal portion that connects upper ends of adjacent ones of the vertical portions; and a lower horizontal portion that connects lower ends of the adjacent ones of the vertical portions, the upper horizontal portion and the lower horizontal portion being alternately disposed, and the lubricating-liquid groove is formed as a zigzag groove continuous from the first end to the second end.

With this arrangement in a so-called rectangular wave, the structure of the lubricating-liquid groove can be simplified.

In the above aspect of the invention, the lubricating-liquid groove preferably includes: a plurality of vertical portions that extend in a vertical direction and are provided side by side in the horizontal direction; and a straight portion that extends in the horizontal direction to connect upper portions of the vertical portions.

With this arrangement, by providing the lubricating-liquid grooves in vertically parallel lines (in a so-called rainfall shape) and providing the foreign-substance collector to a suitable vertical portion of the plurality of vertical portions, the foreign substances can be reliably collected.

In the above aspect of the invention, preferably, the first member includes a table on which a workpiece is set and the second member includes a table bed that supports the table so that the table is movable, the table including: a table base and an adjustment member provided to the table base, and the adjustment member extends in a movement direction of the table base and has the lubricating-liquid groove and the foreign-substance collector formed on a surface facing a vertical surface of the table bed.

With this arrangement, since the lubricating-liquid groove and the foreign-substance collector are provided to the portion requiring the lubrication and being easily entered by the foreign substances in conjunction with the machining of the workpiece, the foreign substances can be efficiently discharged.

DESCRIPTION OF EMBODIMENT(S)

Structure of Industrial Machine

Exemplary embodiment(s) of the invention will be described below with reference to the attached drawings.

Figure 1:
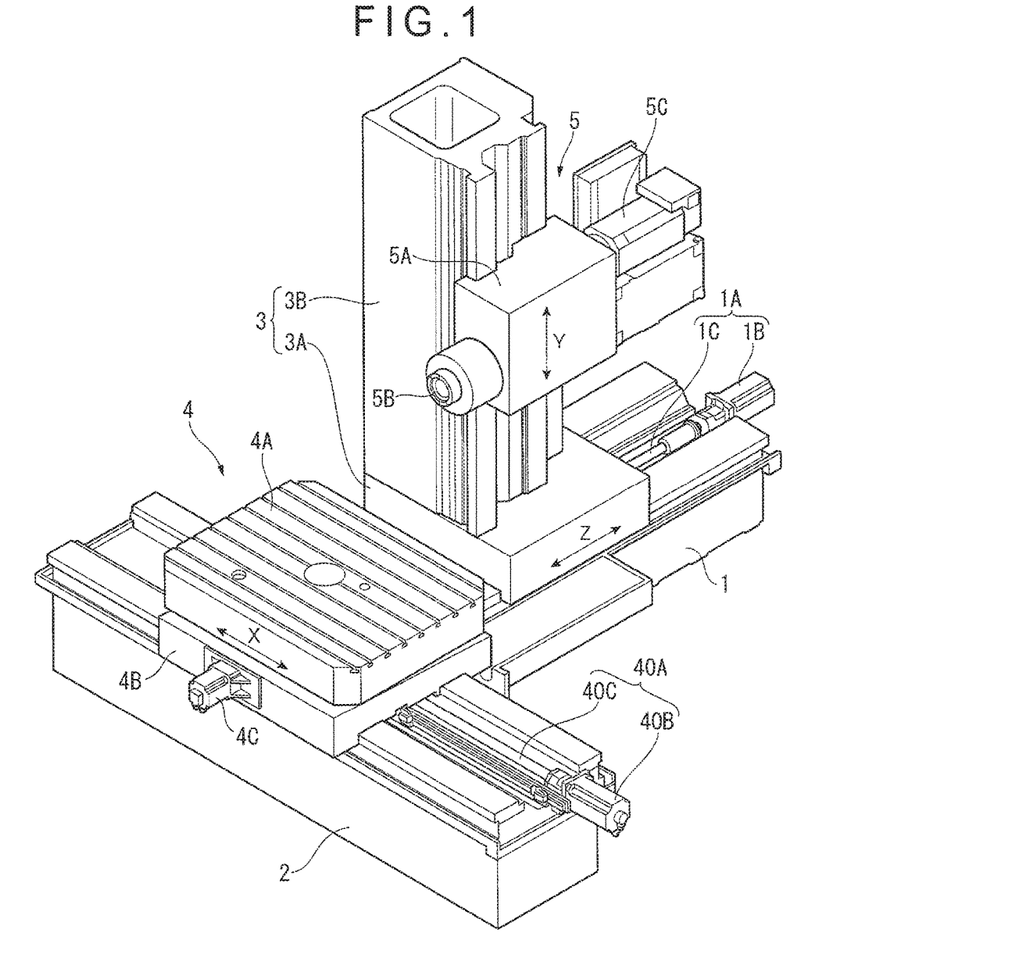
FIG. 1 is a perspective view showing an industrial machine according to an exemplary embodiment of the invention.

FIG. 1 shows an overall structure of an industrial machine according to the exemplary embodiment of the invention.

In FIG. 1, the industrial machine according to the exemplary embodiment of the invention is a boring facing-and-drilling machine.

A milling machine includes: a column bed 1; a table bed 2; a column 3 movable on the column bed 1 in a Z-axis direction; a table 4 movable on the table bed 2 in an X-axis direction; and a spindle head 5 movable on the column 3 in a Y-axis direction. Herein, the X axis and the Z axis are orthogonal to each other and positioned in a horizontal plane while the Y axis vertically extends. It should be noted that, since the boring facing-and-drilling machine of the exemplary embodiment and a machining machine of Patent Literature 1 are different in types, directions indicating the X, Y and Z axes are different depending on the machines.

The column bed 1 includes a column drive mechanism 1A configured to move the column 3 along the Z-axis direction. The column drive mechanism 1A has a motor 1B and a ball screw shaft 1C. A nut member (not shown) fixed to the column 3 is screwed to the ball screw shaft 1C.

The column 3 includes a column base 3A and a column body 3B vertically provided on the column base 3A, in which a spindle head 5 is attached to the column body 3B in a manner to be vertically movable.

The spindle head 5 includes: a casing 5A configured to be guided by the column body 3B; a spindle 5B provided inside the casing 5A and attached with a tool (not shown); and a rotation drive mechanism 5C configured to rotate the spindle 5B. The spindle 5B is in parallel with the Z axis.

The table bed 2 includes a table drive mechanism 40A configured to move the table 4 along the X-axis direction. The table drive mechanism 40A has a motor 40B and a ball screw shaft 40C. A nut member 40D (see FIG. 2) fixed to the table 4 is screwed to the ball screw shaft 40C.

The table 4 includes: a table body 4A on which a workpiece (not shown) is set; and a table base 4B that supports the table body 4A so that the table body 4A is rotatable. The table base 4B is connected to a motor 4C configured to rotate the table body 4A.

Figure 2:
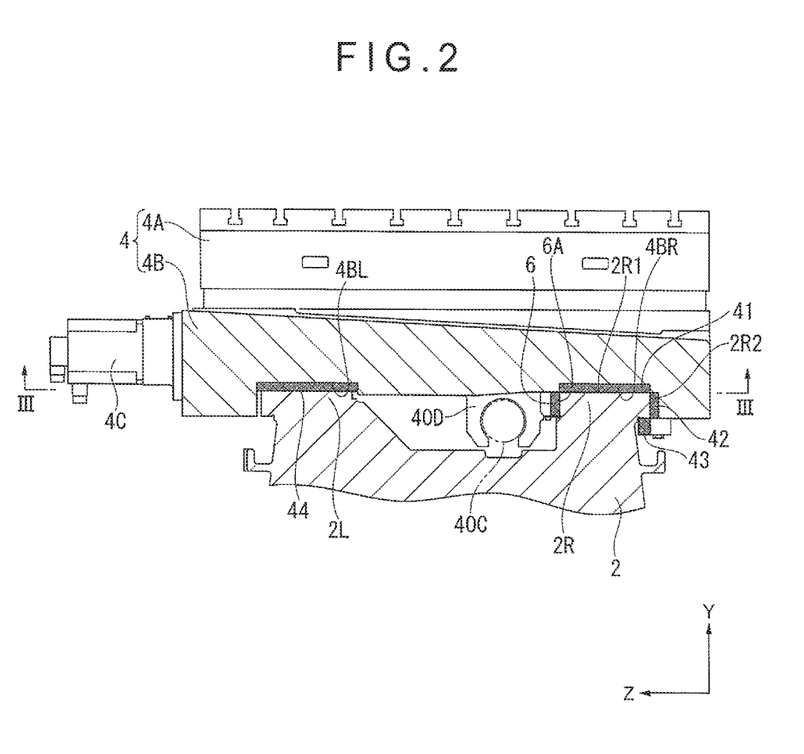
FIG. 2 is a cross-sectional view showing a support structure of a table, in which the table is supported by a table bed.
Figure 3:
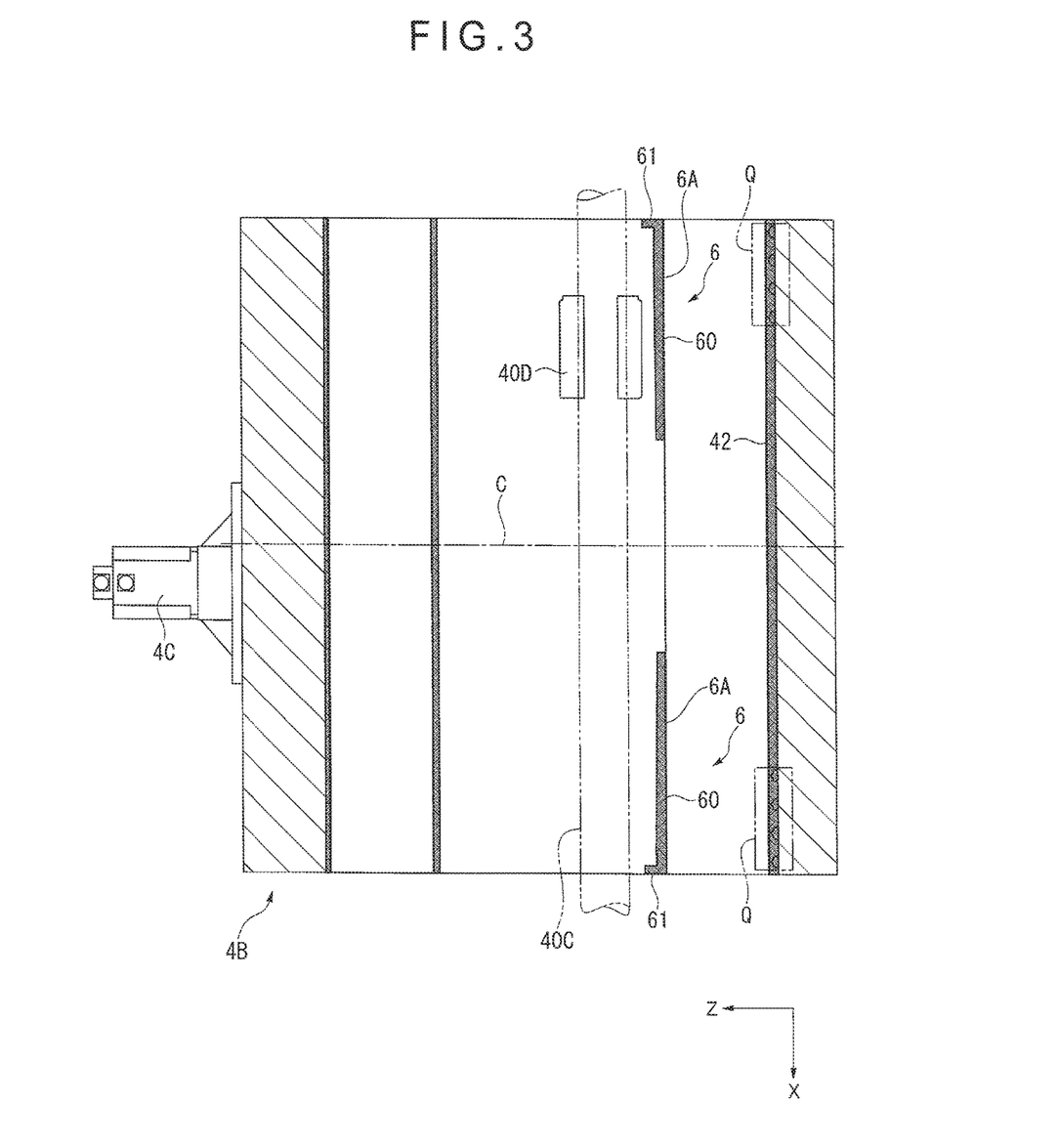
FIG. 3 shows a cross-sectional view taken along a III-III line in FIG. 2.

FIGS. 2 and 3 show a support structure of the table 4 in which the table 4 is supported by the table bed 2. FIG. 2 is a cross-sectional view showing the support structure of the table 4 in which the table 4 is supported by the table bed 2. FIG. 3 is a cross-sectional view taken along a III-III line in FIG. 2.

As shown in FIG. 2, the table bed 2 has rails 2R and 2L provided side by side in the Z-axis direction (a right-and-left direction in the drawing) with the ball screw shaft 40C interposed between the rails 2R and 2L. The rail 2R disposed on the right side in FIG. 2 has a top surface and lateral surfaces extending downward from both ends of the top surface. A horizontal reference plane 2R1 is defined by the top surface of the rail 2R. A vertical reference plane 2R2 is defined by the right lateral surface of the lateral surfaces opposite to each other. The rail 2R has a lower surface at a lower end of the lateral surface defining the vertical reference plane 2R2, the lower surface extending toward the ball screw shaft 40C.

The table base 4B has a concave portion 4BR at a part corresponding to the rail 2R. A horizontal sliding material 41 is stuck on a part of the concave portion 4BR facing the horizontal reference plane 2R1. A vertical sliding material 42 is stuck on a part of the concave portion 4BR facing the vertical reference plane 2R2.

An adjustment member in a form of a wedge member 6 is provided to the left lateral surface (not defining the horizontal reference plane 2R1) of the rail 2R of the table base 4B. A cover plate 43 is provided to the table base 4B to be in contact with the lower surface of the rail 2R.

In the exemplary embodiment, the wedge member 6 is displaced in the X-axis direction, thereby adjusting a clearance in the Z-axis direction of the table base 4B relative to the rail 2R. A sliding material similar to the horizontal sliding material 41 and the vertical sliding material 42 is stuck to a vertical surface 6A (front surface). The vertical plane 6A faces the left lateral surface of the rail 2R. The table 4 and the wedge member 6 define a first member and the table bed 2 defines a second member. The vertical plane 6A (front surface) of the wedge member 6 and the lateral surface of the rail 2R respectively define sliding surfaces.

As shown in FIG. 3, the wedge members 6 face each other across a center line C of the table base 4B and extend along the X axis.

The center line C is aligned with the center of an X-axial length of the table base 4B and is in parallel with the Z axis.

The wedge member 6 includes an elongated plate-shaped body 60 and an attachment portion 61 integrated with a first end of the body 60 near an outer circumference of the machine tool. A second end of the body 60 to which the attachment portion 61 is not attached is disposed in a direction toward the center line C, in other words, in a direction toward a center of the machine tool.

As shown in FIG. 2, the table base 4B has a concave portion 4BL at a part corresponding to the rail 2L disposed on the left side of the table base 4B.

A horizontal sliding member 44 is stuck to a part of the concave portion 4BL facing a top surface of the rail 2L.

Figure 4:
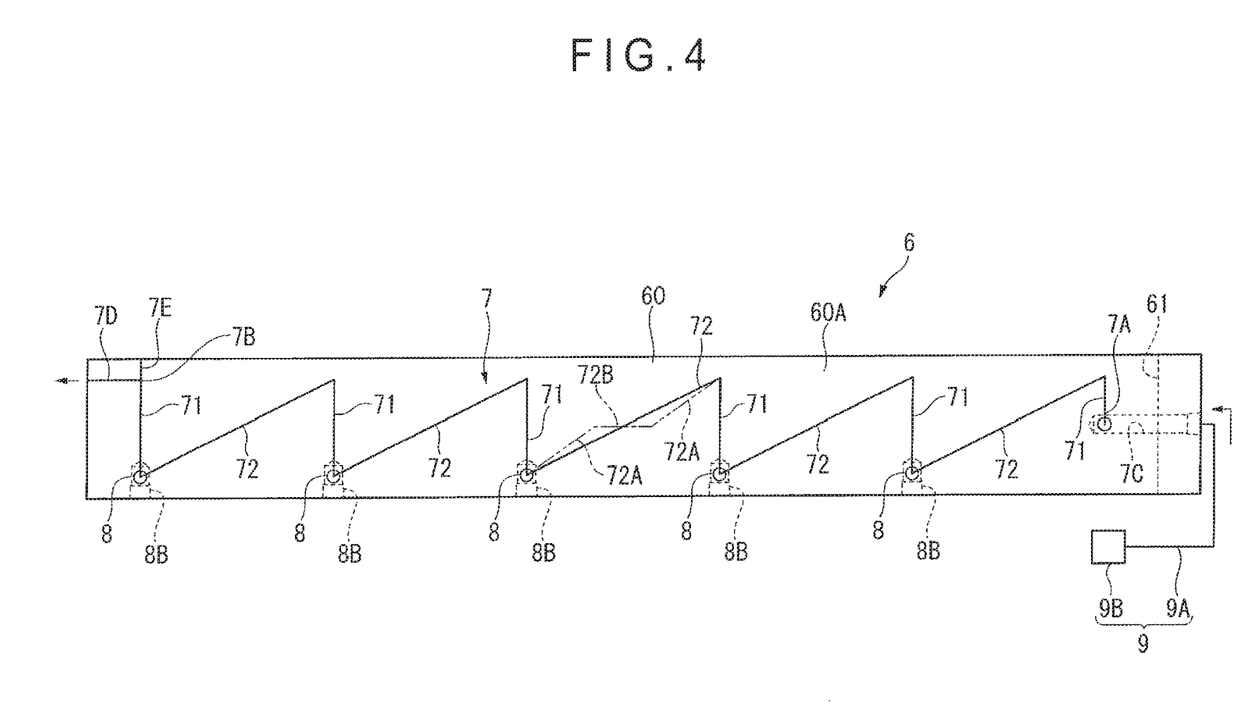
FIG. 4 is a front elevational view of an example of an adjustment member.
Figure 5A:
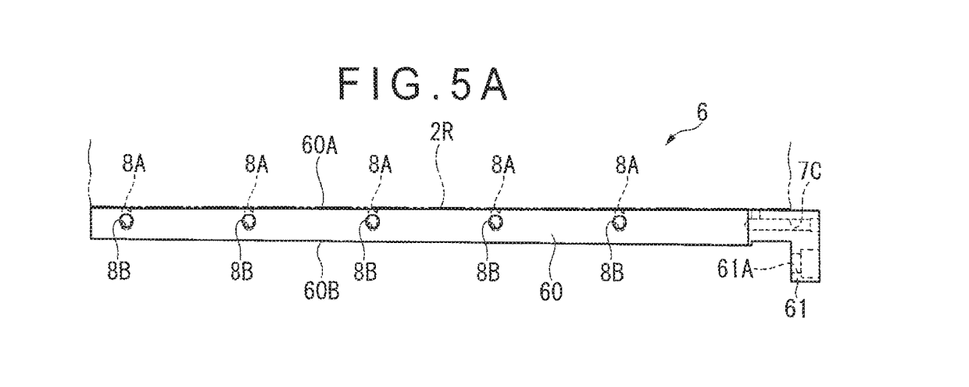
FIG. 5A is a bottom view showing the adjustment member.
Figure 5B:
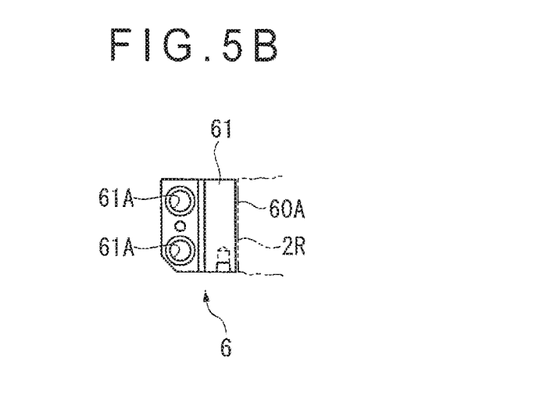
FIG. 5B is a left side view showing the adjustment member.
Figure 5C:
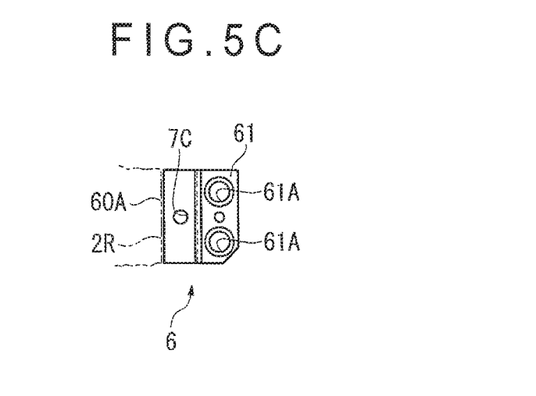
FIG. 5C is a right side view showing the adjustment member.
Figure 6A:
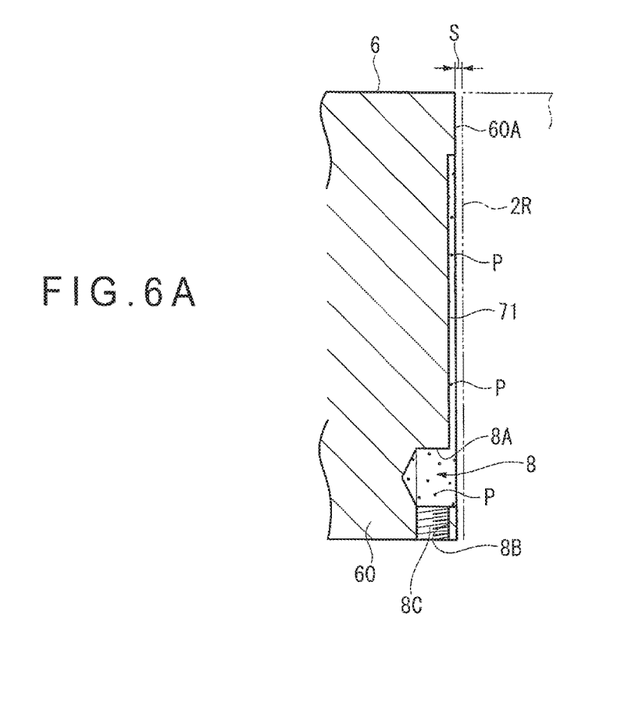
FIG. 6A is a cross-sectional view showing a relevant part of the adjustment member.
Figure 6B:
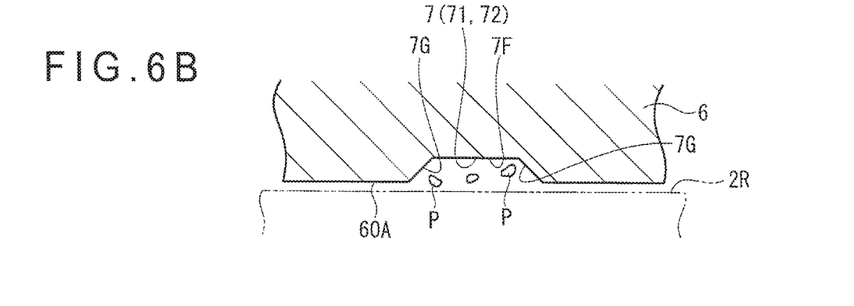
FIG. 6B is a cross-sectional view showing a lubricating-liquid groove.

FIGS. 4 to 6 show an example of the wedge member 6.

FIG. 4 shows a front surface of the wedge member 6. FIG. 5A shows a bottom of the wedge member 6. FIG. 5B shows a left lateral surface of the wedge member 6. FIG. 5C shows a right lateral surface of the wedge member 6. In FIG. 4, the left side of the drawing is directed to the center of the machine tool and the right side of the drawing is directed to the outer circumference of the machine tool.

In the above drawings, the attachment portion 61 has an attachment hole 61A for attaching the wedge member 6 to the table base 4B.

A surface opposite to the front surface 60A of the body 60 is defined as a rear surface 60B. Since the body 60 is wedge-shaped, a dimension between the front surface 60A and the rear surface 60B becomes shorter toward the center of the machine tool.

As shown in FIG. 4, a lubricating-liquid groove 7 configured to receive a lubricating liquid and a foreign-substance collector 8 provided to the lubricating-liquid groove 7 are formed on the front surface 60A of the body 60.

A first end 7A and a second end 7B of the lubricating-liquid groove 7 are spaced apart from each other along the X axis (in a right-and-left direction in FIG. 4). In other words, the first end 7A of the lubricating-liquid groove 7 is positioned near the outer circumference of the machine tool (on the right side of FIG. 4) while the second end 7B is positioned near the center of the machine tool (on the left side of FIG. 4).

The first end 7A of the lubricating-liquid groove 7 is connected to a lubricating-liquid flow mechanism 9 through a lubricating-liquid introduction hole 7C.

The lubricating-liquid flow mechanism 9 is configured to forcibly flow the lubricating liquid into the lubricating-liquid groove 7, and includes a communication pipe 9A in communication with the lubricating-liquid groove 7 and a pump 9B configured to supply the lubricating liquid to the communication pipe 9A. The pump 9B supplies the lubricating liquid to the lubricating-liquid groove 7 constantly or at an adequate interval. In the exemplary embodiment, the lubricating-liquid flow mechanism 9 may be omitted. Even when the lubricating-liquid flow mechanism 9 is provided, the lubricating liquid may be flowed in a direction reverse to the direction of the example shown in FIG. 4, specifically, the lubricating liquid may be flowed in a direction from the second end 7B to the first end 7A of the lubricating-liquid groove 7.

The second end 7B of the lubricating-liquid groove 7 is connected to a lubricating-liquid discharge hole 7D and a ventilator 7E.

The lubricating-liquid discharge hole 7D is connected to a lubricating-liquid collector (not shown) and is formed in a longitudinal direction of the body 60.

The ventilator 7E has an opening on an upper edge of the body 60.

The lubricating-liquid groove 7 in a plan view includes: a plurality of vertical portions 71 that extend in a vertical direction and are provided side by side in a horizontal direction; and inclined portions 72 that each connect a lower end of a first vertical portion to an upper end of a second vertical portion among adjacent ones of the vertical portions 71, the first vertical portion being positioned near the center of the machine tool, the second vertical portion being positioned near the outer circumference of the machine tool. The lubricating-liquid groove 7 is formed as a zigzag groove continuous from the first end 7A to the second end 7B.

The respective upper ends of the plurality of the vertical portions 71 are positioned at the same height. The respective lower ends of the vertical portions 71 are positioned at the same height except for the vertical portion 71 positioned closest to the outer circumference of the machine tool (on the right side of FIG. 4). The lower end of the vertical portion 71 positioned closest to the outer circumference of the machine tool, which is connected to the lubricating-liquid introduction hole 7C, is positioned higher than the other vertical portions 71.

The upper end of the vertical portion 71 positioned closest to the center of the machine tool (on the left side of FIG. 4) among the vertical portions 71 is connected to an end of the lubricating-liquid discharge hole 7D and an end of the ventilator 7E.

Although the inclined portion 72 is in a straight shape in FIG. 4, the inclined portion 72 may be in any shapes. For instance, the inclined portion 72 may have a plurality of straight portions 72A along an inclined direction and a horizontal portion 72B connected to ends of the straight portions 72A and extending in the longitudinal direction of the body 60 (see an imaginary line in FIG. 4).

The foreign-substance collector 8 collects foreign substances P existing in the lubricating-liquid groove 7. Specifically, there is a gap S between the front surface 60A of the wedge member 6 and the lateral surface of the rail 2R (see FIG. 6A), and the foreign-substance collector 8 collects the foreign substances P existing in the lubricating-liquid groove 7 through the gap S. Herein, examples of the foreign substances P are cut powders, dust, sands, pebbles and garbage.

As shown in FIG. 4, the foreign-substance collector 8 is provided to each of the lower ends of the vertical portions 71 other than the vertical portion 71 positioned closest to the outer circumference of the machine tool among the plurality of vertical portions 71. However, in the exemplary embodiment, the arrangement position of the foreign-substance collector 8 is not limited to the arrangement position shown in FIG. 4, but it is only required that at least one foreign-substance collector 8 is arranged to the vertical portion 71 positioned near the outer circumference of the machine tool. Alternatively, a length of the vertical portion 71 positioned closest to the outer circumference of the machine tool may be increased by an extension toward a lower portion of the wedge member 6. The foreign-substance collector 8 may be provided in the extension.

It is only required that the foreign-substance collector 8 is provided to the lower portion of the lubricating-liquid groove 7. The arrangement of the foreign-substance collector 8 is not limited to the lower end of the vertical portion 71. In other words, it is only required that the foreign-substance collector 8 is positioned between the lower end of the vertical portion 71 and a half length of the vertical portion 71.

FIGS. 6A and 6B respectively show the cross sections of the lubricating-liquid groove 7.

As shown in FIG. 6A, the foreign-substance collector 8 has a concave portion 8A having a depth deeper than a depth of the vertical portion 71. A planar shape of the concave portion 8A is a circle having a diameter larger than a width of the vertical portion 71 (see FIG. 4). A foreign-substance discharge channel 8B for discharging the foreign substances P accumulated in the foreign-substance collector 8 is formed on a circumference of the concave portion 8A.

The foreign-substance discharge channel 8B has an opening at a lower edge of the body 60. A plug 8C is detachably provided to the foreign-substance discharge channel 8B. The plug 8C is removed from the foreign-substance collector 8 when the foreign substances P accumulated in the foreign-substance discharge channel 8B are discharged to the outside. The plug 8C is not limited to a screw member shown in FIG. 6A as long as the plug 8C is attachable to and detachable from the foreign-substance discharge channel 8B.

As shown in FIG. 6B, the lubricating-liquid groove 7 has a cross section defined by a bottom 7F in parallel with the front surface 60A and an inclined surface 7G connected to each of both ends of the bottom 7F. However, a shape of the lubricating-liquid groove 7 is not limited to a shape as shown in FIG. 6B, but may be semicircular and the like as long as the lubricating-liquid groove 7 has an opening facing the rail 2R.

Figure 7:
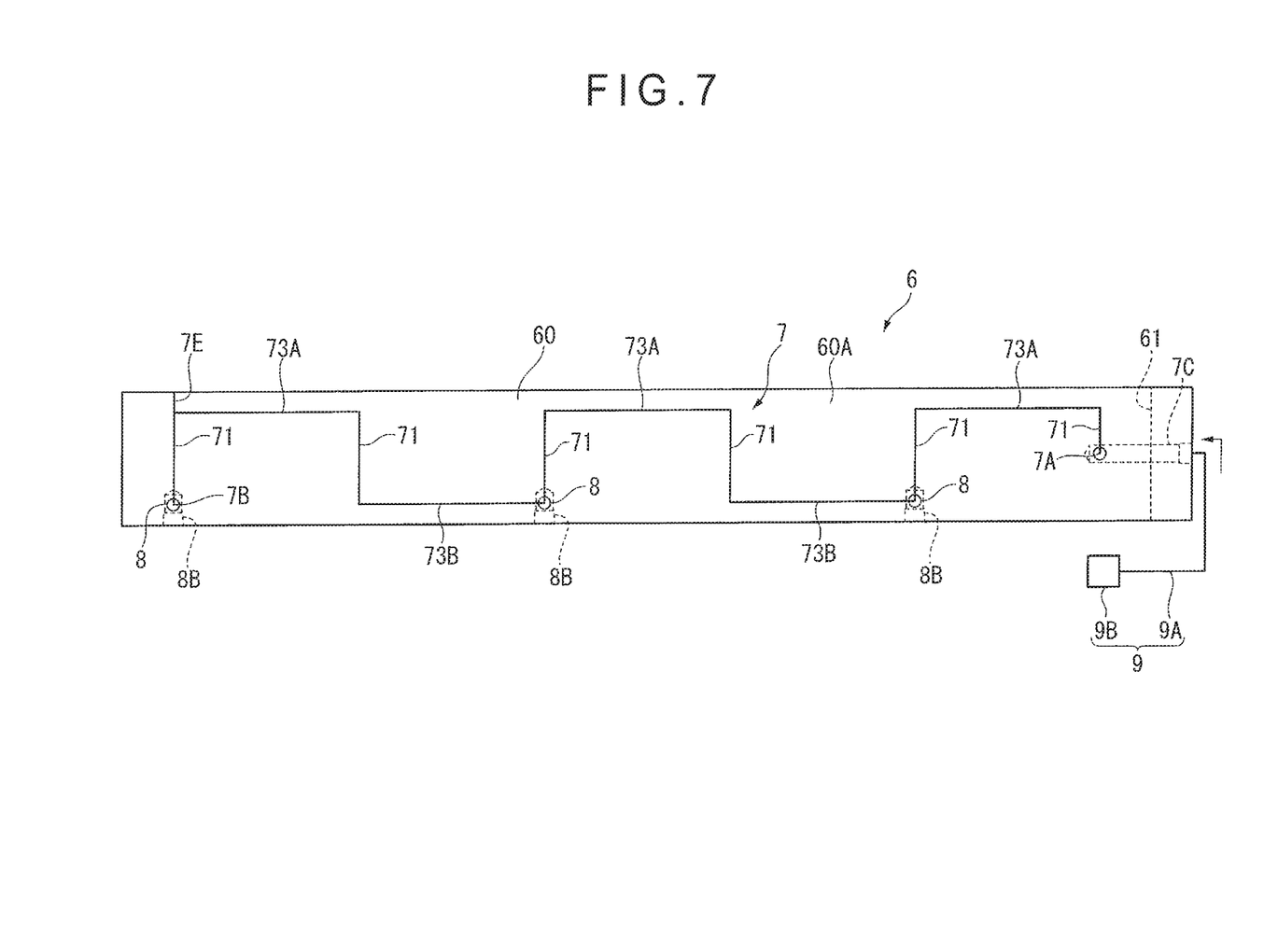
FIG. 7 is a front elevational view of another example of the adjustment member, corresponding to FIG. 4.
Figure 8:
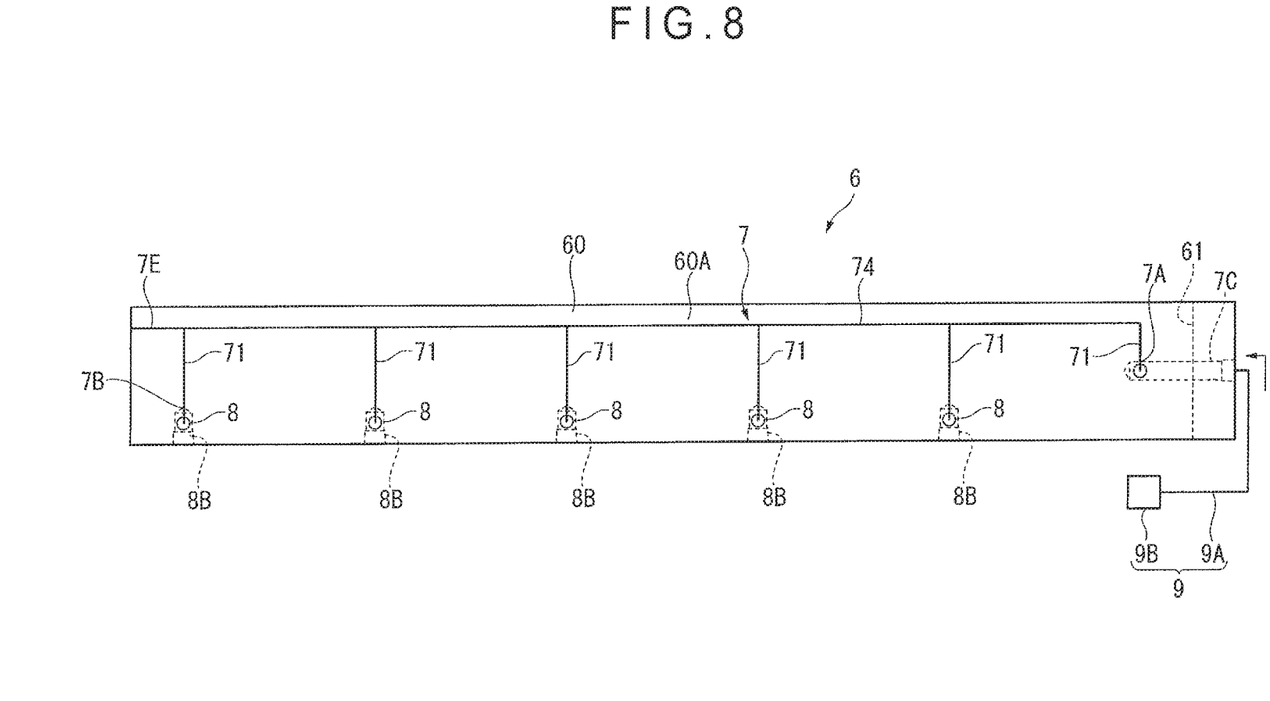
FIG. 8 is a front elevational view of still another example of the adjustment member, corresponding to FIG. 4.
Figure 9:
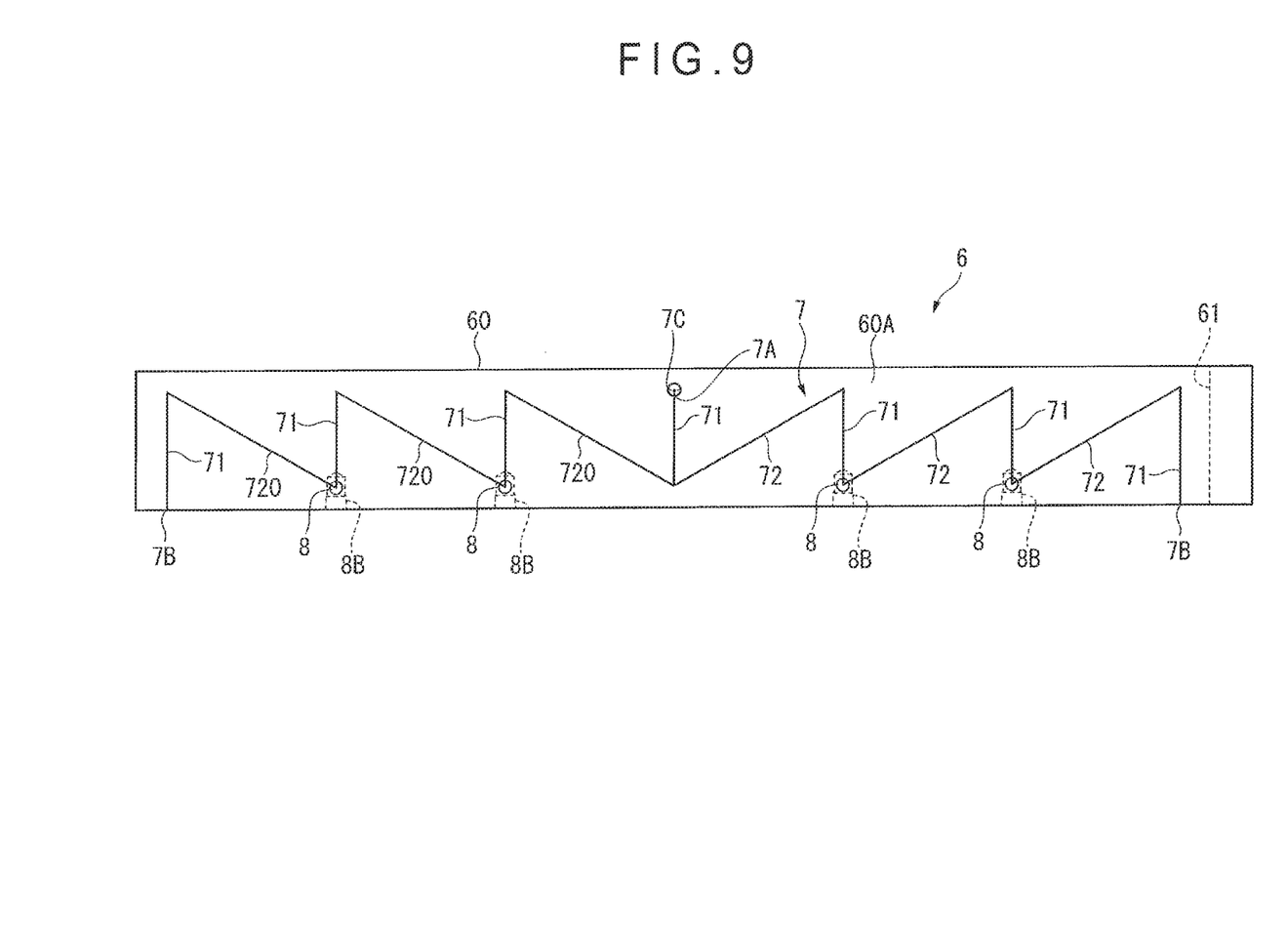
FIG. 9 is a front elevational view of a further example of the adjustment member, corresponding to FIG. 4.

FIGS. 7 to 9 respectively show front surfaces of the lubricating-liquid groove 7 having different planar shapes from that in FIG. 4.

As shown in FIG. 7, the lubricating-liquid groove 7 includes: a plurality of vertical portions 71; an upper horizontal portion 73A connecting upper ends of adjacent ones of the vertical portions 71; and a lower horizontal portion 73B connecting lower ends of the adjacent ones of the vertical portions 71. The upper horizontal portion 73A and the lower horizontal portion 73B are alternately arranged along the longitudinal direction of the body 60 to provide a groove shaped in a rectangular wave continuous from the first end 7A to the second end 7B of the lubricating-liquid groove 7.

The foreign-substance collector 8 is provided to the lower portion of the lubricating-liquid groove 7.

The foreign-substance collector 8 is provided to the lower end of the vertical portion 71 positioned closest to the center of the machine tool and a connection portion between the lower end of the vertical portion 71 and an end of the lower horizontal portion 73B near the outer circumference of the machine tool. Among the vertical portions 71, the lower end of the vertical portion 71 positioned closest to the center of the machine tool is defined as the second end 7B of the lubricating-liquid groove 7. The arrangement position of the foreign-substance collector 8 is not limited to the arrangement position shown in FIG. 7, but it is only required that at least one foreign-substance collector 8 is arranged to the vertical portion 71 positioned near the outer circumference of the machine tool. Further, the arrangement position of the foreign-substance collector 8 is not limited to the lower end of the vertical portion 71, but is only required to be lower than the center of the vertical portion 71.

Even in the example shown in FIG. 7, similar to the example shown in FIG. 4, the lubricating-liquid flow mechanism 9 may be omitted. Even when the lubricating-liquid flow mechanism 9 is provided, the lubricating liquid may be flowed in a direction reverse to the direction of the example shown in FIG. 4, specifically, the lubricating liquid may be flowed in a direction from the second end 7B to the first end 7A of the lubricating-liquid groove 7.

As shown in FIG. 8, the lubricating-liquid groove 7 includes: the plurality of vertical portions 71 that extend in the vertical direction and are provided side by side in the horizontal direction; and a straight portion 74 that extends along the X axis to connect upper portions of the vertical portions 71.

The foreign-substance collector 8 is provided to the lower portion of the lubricating-liquid groove 7. The foreign-substance collector 8 is provided to each of the lower ends of the vertical portions 71 other than the vertical portion 71 positioned closest to the outer circumference of the machine tool among the plurality of vertical portions 71. The arrangement position of the foreign-substance collector 8 is not limited to the arrangement position shown in FIG. 8, but it is only required that at least one foreign-substance collector 8 is arranged to the vertical portion 71 positioned near the outer circumference of the machine tool. Further, the arrangement position of the foreign-substance collector 8 is not limited to the lower end of the vertical portion 71, but is only required to be lower than the center of the vertical portion 71.

Even in the example shown in FIG. 8, similar to the example shown in FIG. 4, the lubricating-liquid flow mechanism 9 may be omitted. Even when the lubricating-liquid flow mechanism 9 is provided, the lubricating liquid may be flowed in a direction reverse to the direction of the example shown in FIG. 4, specifically, a direction in which the lubricating liquid is flowed from the second end 7B to the first end 7A of the lubricating-liquid groove 7.

As shown in FIG. 9, the lubricating-liquid introduction hole 7C is formed at the longitudinal center of the body 60.

The lubricating-liquid groove 7 includes: the plurality of vertical portions 71 that extend in the vertical direction and are provided side by side in the horizontal direction; the inclined portions 72 that are provided between the vertical portion 71 provided at the center and the vertical portion 71 provided near the outer circumference of the machine tool; and inclined portions 720 that are provided between the vertical portion 71 provided at the center and the vertical portion 71 provided near the center of the machine tool.

Similar to the inclined portion 72 shown in FIG. 4, each of the inclined portions 72 connects the lower end of the vertical portion 71 positioned near the center of the machine tool and the upper end of the vertical portion 71 positioned near the outer circumference of the machine tool among adjacent ones of the vertical portions 71.

Reverse to the inclined portions 72 shown in FIG. 4, each of the inclined portions 720 connects the upper end of the vertical portion 71 positioned near the center of the machine tool and the lower end of the vertical portion 71 positioned near the outer circumference of the machine tool among adjacent ones of the vertical portions 71.

The lower end of the vertical portion 71 positioned closest to the center of the machine tool and the lower end of the vertical portion 71 positioned closest to the outer circumference of the machine tool respectively define the second ends 7B of the lubricating-liquid groove 7.

The foreign-substance collector 8 is provided to the lower portion of the lubricating-liquid groove 7. The foreign-substance collector 8 is provided to each of the lower ends of the vertical portions 71 other than three vertical portions 71 that are the central vertical portion 71, the vertical portion 71 closest to the outer circumference, and the vertical portion 71 closest to the center of the machine tool among the plurality of vertical portions 71. The arrangement position of the foreign-substance collector 8 is not limited to the arrangement position shown in FIG. 9, but it is only required that at least one foreign-substance collector 8 is arranged to each of the vertical portion 71 positioned near the outer circumference of the machine tool and the vertical portion 71 positioned near the center of the machine tool.

The lubricating-liquid flow mechanism 9 is not shown in FIG. 9. The lubricating-liquid flow mechanism 9 may be provided or omitted. Even when the lubricating-liquid flow mechanism 9 is provided, the lubricating liquid may be flowed in a direction from the first end 7A to the second end 7B of the lubricating-liquid groove 7 or in a direction reverse to the above. Even in the examples shown in FIGS. 7 and 8, similar to the example shown in FIG. 9, the first end 7A of the lubricating-liquid groove 7 may be defined at the center of the lubricating-liquid groove 7 while the second ends 7B may be defined at the end of the lubricating-liquid groove 7 near the center of the machine tool and the end of the lubricating-liquid groove 7 near the outer circumference of the machine tool.

Collection Operation of Foreign Substances

In the machine tool with the above arrangement, the workpiece set on the table 4 is to be machined with the tool attached to the spindle head 5. The workpiece is machined while the table 4 is moved relative to the table bed 2.

In association with the machining of the workpiece, foreign substances P are generated. The foreign substances P are scattered over the table 4. For instance, the foreign substances P enter the gap S between the vertical surface 6A of the wedge member 6 positioned under the table 4 and the lateral surface of the rail 2R of the table bed 2.

The foreign substances P existing in the gap S between the vertical surface 6A of the wedge member 6 and the lateral surface of the rail 2R enter an inside of the lubricating-liquid groove 7 provided on the front surface of the wedge member 6 by the relative movement of the wedge member 6 and the rail 2R. Subsequently, in conjunction with the relative movement of the wedge member 6 and the rail 2R, the foreign substances P are transferred inside the lubricating-liquid groove 7 from the center of the machine tool toward the outer circumference of the machine tool and are finally collected by the foreign-substance collector 8. The collected foreign substances P are discharged to the outside from the foreign-substance discharge channel 8B after the plug 8C is detached from the foreign-substance discharge channel 8B.

For instance, in the wedge member 6 shown in FIG. 4, when the foreign substances P enter the inclined portion 72, the foreign substances P fall by their own weights in conjunction with the relative movement of the wedge member 6 and the rail 2R and are collected by the foreign-substance collector 8. The above movement of the foreign substances P is possible even when the lubricating liquid is not forcibly flowed into the lubricating-liquid groove 7.

The foreign substances P collected by the foreign-substance collector 8 stay in the foreign-substance collector 8 in spite of the relative movement of the wedge member 6 and the rail 2R. The foreign substances P accumulated in the foreign-substance collector 8 are discharged to the outside as needed.

In an arrangement in which only one foreign-substance collector 8 is provided to the vertical portion 71 positioned closest to the outer circumference of the machine tool, no foreign-substance collector 8 is provided at a connection portion between the lower end of the vertical portion 71 and the lower end of the inclined portion 72. The foreign substances P existing in the connection portion between the lower end of the vertical portion 71 and the lower end of the inclined portion 72 move up the gentle inclined portion 72 instead of the steep vertical portion 71 in conjunction with the relative movement of the wedge member 6 and the rail 2R. The foreign substances P moved up from the lower end to the upper end of the inclined portion 72 fall from the upper end to the lower end of the vertical portion 71. This movement is repeated, so that the foreign substances P are finally collected by the foreign-substance collector 8.

In the wedge member 6 shown in FIG. 7, when the foreign substances P enter the upper horizontal portion 73A, the foreign substances P are transferred toward an end of the upper horizontal portion 73A in conjunction with the relative movement of the wedge member 6 and the rail 2R. When the foreign substances P reach the end of the upper horizontal portion 73A, the foreign substances P fall from the upper end to the lower end of the vertical portion 71 by their own weights and collected by the foreign-substance collector 8. When the foreign substances P fall on a connection portion between the vertical portion 71 and the lower horizontal portion 73B, the foreign substances P are transferred on the lower horizontal portion 73B and finally collected by the foreign-substance collector 8. The above movement of the foreign substances P is possible even when the lubricating liquid is not forcibly flowed into the lubricating-liquid groove 7.

In the wedge member 6 shown in FIG. 8, when the foreign substances P enter the vertical portion 71, the foreign substances P fall by their own weights toward the lower end of the vertical portion 71 and are collected by the foreign-substance collector 8. Further, after the foreign substances P enter the straight portion 74, the foreign substances P existing on the straight portion 74 fall on the vertical portion 71 positioned closest to the straight portion 74 and are finally collected by the foreign-substance collector 8.

In the wedge member 6 shown in FIG. 9, when the foreign substances P enter the inclined portion 72 and the inclined portion 720, the foreign substances P fall by their own weights and are collected by the foreign-substance collector 8. When the foreign substances P enter the middle vertical portion 71, the foreign substances P fall on the lower end of the vertical portion 71 and are moved up along the inclined portion 72 and the inclined portion 720 in conjunction with the relative movement of the wedge member 6 and the rail 2R, so that the foreign substances P finally fall along the vertical portion 71 adjacent to the middle vertical portion 71 and are collected by the foreign-substance collector 8.

Advantage(s) of Embodiment(s)

Accordingly, in the exemplary embodiment, the following advantages can be provided.

The foreign-substance discharge mechanism includes: the lubricating-liquid groove 7 provided on the sliding surface of the wedge member 6 and configured to receive the lubricating liquid; and the foreign-substance collector 8 provided to the lubricating-liquid groove 7 and configured to collect the foreign substances P existing in the lubricating-liquid groove 7. The first end 7A and the second end 7B of the lubricating-liquid groove 7 are spaced apart from each other in the relative movement direction of the wedge member 6 and the table bed 2. With the above arrangement, disadvantages caused by the presence of the foreign substances P between the sliding surfaces can be easily avoided by reliably collecting the foreign substances P existing between the sliding surfaces using the lubricating-liquid groove 7 and the foreign-substance collector 8.

The relative movement direction of the wedge member 6 and the table bed 2 is in alignment with the horizontal direction. The sliding surface of the wedge member 6 is defined as the vertical surface 6A. The foreign-substance collector 8 is provided to the lower portion of the lubricating-liquid groove 7. With this arrangement, the foreign substances P existing between the sliding surfaces are reliably collected by the foreign-substance collector 8 provided to the lower portion of the lubricating-liquid groove 7.

Since the first end 7A of the lubricating-liquid groove 7 is positioned near the outer circumference of the machine tool, the second end 7B of the lubricating-liquid groove 7 is positioned near the center of the machine tool and the foreign-substance collector 8 is provided to the lubricating-liquid groove 7 near the outer circumference of the machine tool, the operation for discharging the foreign substances P from the foreign-substance collector 8 can be facilitated.

With the lubricating-liquid flow mechanism 9 configured to forcibly flow the lubricating liquid into the lubricating-liquid groove 7, lubrication between the wedge member 6 and the table bed 2 can be reliably obtained and further the foreign substances P existing in the lubricating-liquid groove 7 can be reliably discharged to the outside. Particularly, by feeding the lubricating liquid toward the outer circumference of the machine tool from the center of the machine tool to feed the lubricating liquid toward the foreign-substance collector 8, the foreign substances P are transferred together with the lubricating liquid to the foreign-substance collector 8, so that the foreign substances P can be more reliably collected.

Since the lubricating-liquid groove 7 and the foreign-substance collector 8 are provided to the wedge member 6 requiring the lubrication and easily entered by the foreign substances P in conjunction with the machining of the workpiece, the foreign substances can be efficiently discharged.

When the lubricating-liquid groove 7 includes: the plurality of vertical portions 71; and the inclined portion 72 that connects the lower end of the vertical portion 71 positioned near the center of the machine tool to the upper end of the vertical portion 71 positioned near the outer circumference of the machine tool among the vertical portions 71, and the lubricating-liquid groove 7 is formed as a zigzag groove continuous from the first end 7A to the second end 7B, the foreign substances P existing at the lower end of the vertical portion 71 are moved obliquely up on the inclined portion 72 and, subsequently, moved down along the vertical portion 71 by their own weights, so that the foreign substances P can be reliably transferred to the foreign-substance collector 8. When the inclined portion 72 is in a straight shape, the structure of the lubricating-liquid groove 7 can be simplified.

The structure of the lubricating-liquid groove 7 can be simplified by including: the plurality of vertical portions 71; the upper horizontal portion 73A connecting the upper ends of adjacent ones of the vertical portions 71; and the lower horizontal portion 73B connecting the lower ends of the adjacent ones of the vertical portions 71, in which the upper horizontal portion 73A and the lower horizontal portion 73B are alternately arranged and the lubricating-liquid groove 7 is in a form of a groove shaped in a rectangular wave continuous from the first end 7A to the second end 7B.

According to the rainfall shape arrangement of the lubricating-liquid groove 7 including: the plurality of vertical portions 71; and the straight portion 74 that extends in the horizontal direction to connect the upper ends of the vertical portions 71, the foreign-substance collector 8 is provided to each of the plurality of vertical portions 71 to reliably collect the foreign substances P.

The invention is not limited to the above-described embodiment(s), and modifications and improvements may be included as long as an object of the invention can be attained.

For instance, in the exemplary embodiment, the adjustment member having the lubricating-liquid groove 7 and the foreign-substance collector 8 is provided by the wedge member 6. However, in the invention, as shown by a reference Q in FIG. 3, the adjustment member may be positioned corresponding to the vertical sliding material 42. The adjustment member is an elongated plate member also serving as the vertical sliding material 42, in which the lubricating-liquid groove 7 and the foreign-substance collector 8 are formed on a vertical surface of the adjustment member facing the lateral surface of the rail 2R.

Alternatively, in the invention, the lubricating-liquid groove 7 and the foreign-substance collector 8 may be directly formed on the lateral surface of the rail 2R. Alternatively, the lubricating-liquid groove 7 and the foreign-substance collector 8 may be formed on the adjustment member positioned instead of the rail 2R between the rail 2L and the table base 4B.

Further alternatively, the wedge member 6 having the lubricating-liquid groove 7 and the foreign-substance collector 8 may be interposed between other components of the machine tool, for instance, between the column bed 1 and the column 3.

The industrial machine is not limited to the boring facing-and-drilling machine. The invention is applicable to any machine tools and industrial machines other than the machine tools, which include mutually relatively movable members in the horizontal direction and the vertical direction while the foreign substances P are generated during machining.

The invention is applicable to machine tools such as a boring facing-and-drilling machine and a milling machine and industrial machines other than the machine tools.

The invention claimed is:

1. An industrial machine comprising a foreign-substance discharge mechanism, comprising:
    a first member and a second member that are movable relative to each other and that have respective sliding surfaces facing each other;
    a lubricating-liquid groove provided on at least one of the sliding surfaces of the first and second members and configured to receive a lubricating liquid; and
    a foreign-substance collector provided to a lower portion of the lubricating-liquid groove and configured to collect foreign substances existing in the lubricating-liquid groove, wherein
    a first end and a second end of the lubricating-liquid groove are spaced apart from each other in a relative movement direction of the first member and the second member, and
    the relative movement direction of the first member and the second member is in alignment with a horizontal direction, the sliding surfaces each being in a form of a vertical surface.

2. The industrial machine comprising the foreign-substance discharge mechanism according to claim 1, further comprising:
    a lubricating-liquid flow mechanism configured to forcibly flow the lubricating liquid into the lubricating-liquid groove.

3. The industrial machine comprising the foreign-substance discharge mechanism according to claim 1, wherein
    the lubricating-liquid groove has the first end on a side toward an outer circumference of the industrial machine and the second end on a side toward a center of the industrial machine, and
    the foreign-substance collector is disposed on the side of the lubricating-liquid groove toward the outer circumference of the industrial machine.

4. The industrial machine comprising the foreign-substance discharge mechanism according to claim 3, wherein
    the lubricating-liquid groove comprises: a plurality of vertical portions that extend in a vertical direction and are provided side by side in the horizontal direction; and inclined portions that each connect a lower end of a first vertical portion to an upper end of a second vertical portion among adjacent ones of the vertical portions, the first vertical portion being positioned toward the center of the industrial machine, the second vertical portion being positioned toward the outer circumference of the industrial machine, and
    the lubricating-liquid groove defines a groove continuous from the first end to the second end.

5. The industrial machine comprising the foreign-substance discharge mechanism according to claim 4, wherein
    the inclined portions each connect a lower portion of the first vertical portion to an upper portion of the second vertical portion among the adjacent ones of the vertical portions.

6. The industrial machine comprising the foreign-substance discharge mechanism according to claim 1, wherein
    the lubricating-liquid groove comprises: a plurality of vertical portions that extend in a vertical direction and are provided side by side in the horizontal direction; an upper horizontal portion that connects upper ends of adjacent ones of the vertical portions; and a lower horizontal portion that connects lower ends of the adjacent ones of the vertical portions, the upper horizontal portion and the lower horizontal portion being alternately disposed, and
    the lubricating-liquid groove is formed as a zigzag groove continuous from the first end to the second end.

7. The industrial machine comprising the foreign-substance discharge mechanism according to claim 1, wherein
    the lubricating-liquid groove comprises: a plurality of vertical portions that extend in a vertical direction and are provided side by side in the horizontal direction; and a straight portion that extends in the horizontal direction to connect upper portions of the vertical portions.

8. The industrial machine comprising the foreign-substance discharge mechanism according to claim 1, wherein
    the first member comprises a table on which a workpiece is set and the second member comprises a table bed that supports the table so that the table is movable, the table comprising: a table base and an adjustment member provided to the table base, and
    the adjustment member extends in a movement direction of the table base and has the lubricating-liquid groove and the foreign-substance collector formed on a surface facing a vertical surface of the table bed.

* * * * *